United States Patent [19]
Mittelstaedt et al.

[11] Patent Number: 5,870,642
[45] Date of Patent: Feb. 9, 1999

[54] PANORAMIC SUPPORT FOR CAMERA PERMITS HORIZONTAL-FORMAT AND VERTICAL-FORMAT IMAGE RECORDINGS

[75] Inventors: Brian E. Mittelstaedt, W. Henrietta; Joseph A. Manico, Rochester; John R. Domm, Ontario, all of N.Y.

[73] Assignee: Eastman Kodak Company, Rochester, N.Y.

[21] Appl. No.: 910,867

[22] Filed: Aug. 13, 1997

[51] Int. Cl.[6] .............................. F16M 11/04; G01B 3/00; G03B 37/00
[52] U.S. Cl. ........................... 396/428; 396/20; 396/281; 116/213; 248/187.1; 33/570
[58] Field of Search .............................. 396/20, 419, 428, 396/281, 284, 50; 248/179.1, 183.2, 186.2, 187.1, 346.01, 349.1, 542, 543; 116/200, 213; 348/36, 37; 33/569, 570

[56] References Cited

U.S. PATENT DOCUMENTS

| 651,521 | 6/1900 | Bigsby-Chamberlin | 248/183.2 |
|---|---|---|---|
| 812,233 | 2/1906 | Rock | 248/187.1 |
| 1,028,167 | 6/1912 | Williams | 248/186.2 |
| 1,083,575 | 1/1914 | White | 248/186.2 |
| 1,115,253 | 10/1914 | Smith | 248/187.1 |
| 1,259,126 | 3/1918 | Parkes | 248/186.2 |
| 1,282,177 | 10/1918 | Blankenhorn | 396/20 |
| 2,145,584 | 1/1939 | Chamberlain, Jr. | 248/179.1 |
| 2,589,892 | 3/1952 | Suzukawa | 248/187.1 |
| 3,183,810 | 5/1965 | Campbell et al. | 396/20 |
| 4,175,842 | 11/1979 | Sakurada et al. | 396/281 X |
| 4,341,452 | 7/1982 | Korling | 396/428 |
| 5,752,113 | 5/1998 | Borden | 396/20 |

Primary Examiner—David M. Gray
Assistant Examiner—J. K. Han
Attorney, Agent, or Firm—Rogers A. Fields

[57] ABSTRACT

A panoramic support for a camera having a rotatable indexing head used to rotate the camera the same angle between successive image recordings in order to obtain a series of recorded images that can be combined to provide a comprehensive panoramic image, is characterized in that the rotatable indexing head is adapted to support the camera alternatively in a horizontal orientation for making horizontal-format recorded images and in a vertical orientation for making vertical-format recorded images, and includes respective angle indicators for rotating the camera one angle between each horizontal-format image recording and another angle between each vertical-format image recording.

6 Claims, 6 Drawing Sheets

PANORAMIC SUPPORT FOR CAMERA PERMITS HORIZONTAL-FORMAT AND VERTICAL-FORMAT IMAGE RECORDINGS

FIELD OF THE INVENTION

The invention relates generally to the field of photography. More particularly, the invention relates to a panoramic support used to rotate a conventional camera or a digital camera the same angle between successive image recordings in order to obtain a series of recorded images that can be combined manually or electronically to provide a comprehensive panoramic image.

BACKGROUND OF THE INVENTION

A panorama is a picture that presents a continuous view of the landscape. Typically, such comprehensive pictures are generally created from a series of separate photographs covering the horizon, in slightly overlapping sections.

When an ordinary camera is used for making panoramic pictures, certain precautions must be taken or the adjacent photographs will not dovetail into one another without leaving a visible join. First, the camera must be mounted on a tripod or the like. This is to make sure that all of the photographs are taken from the same viewpoint. If the viewpoint moves between one exposure and the next, the perspective of the two photographs is no longer the same, and it is not possible to find a common boundary for joining them. Second, the camera should be mounted on a rotatable indexing head marked off to show successive evenly-spaced camera positions that will cover the horizon in sections with a suitable overlap between each section.

Typically, the rotatable indexing head only supports the camera in a horizontal orientation for making horizontal-format exposures, i.e. exposures formatted with the horizontal dimension being greater than the vertical dimension. Alternatively, the rotatable indexing head only supports the camera in a vertical orientation for making vertical-format exposures, i.e. exposures formatted with the vertical dimension being greater than the horizontal dimension.

SUMMARY OF THE INVENTION

A panoramic support for a camera comprising a rotatable indexing head used to rotate the camera the same angle between successive image recordings in order to obtain a series of recorded images that can be combined to provide a comprehensive panoramic image, is characterized in that:

the rotatable indexing head is adapted to support the camera alternatively in a horizontal orientation for making horizontal-format recorded images and in a vertical orientation for making vertical-format recorded images, and includes respective angle indicators for rotating the camera one angle between each horizontal-format image recording and another angle between each vertical-format image recording.

DETAILED DESCRIPTION OF THE INVENTION

Figure 1:
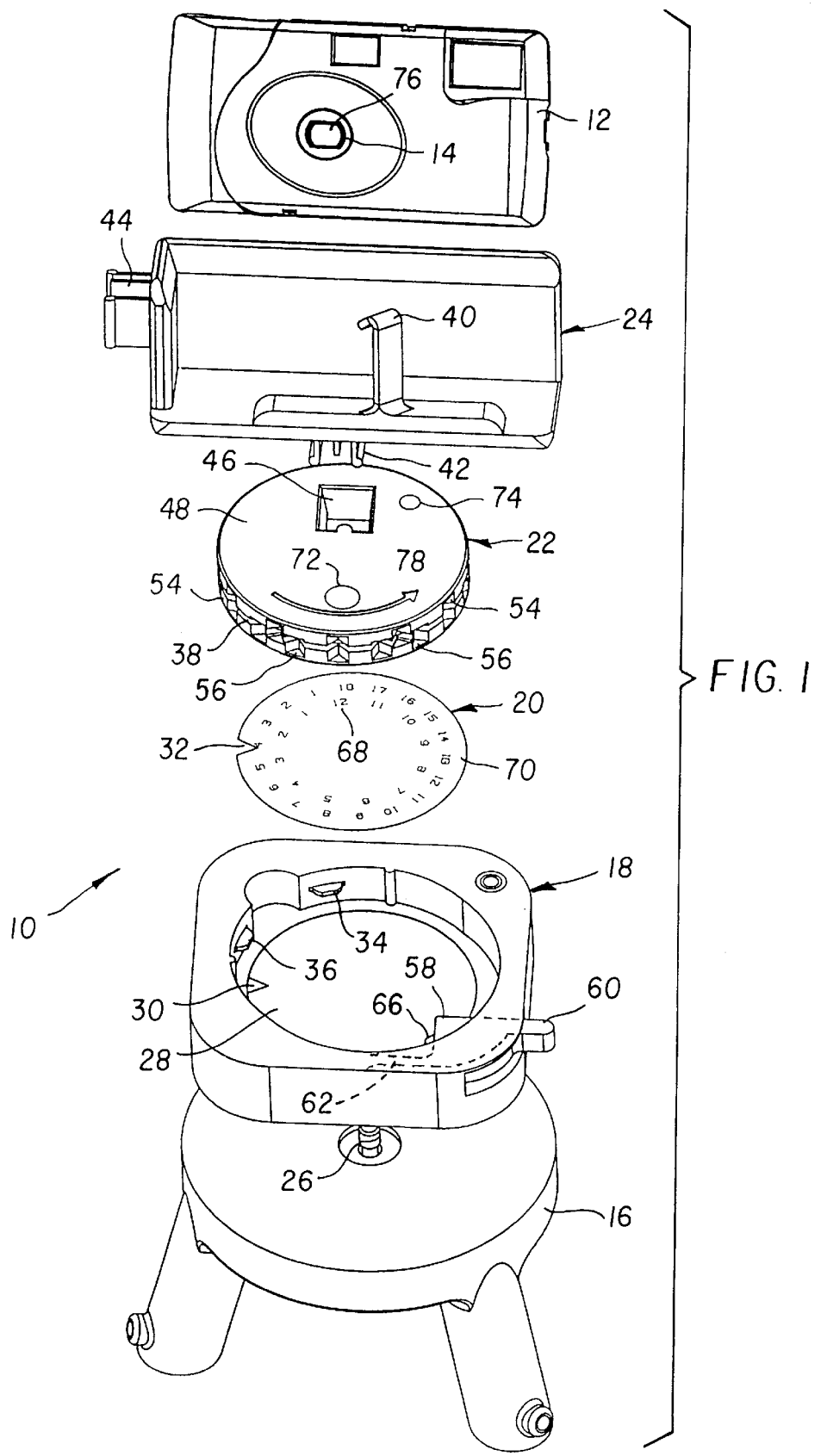
FIG. 1 is an exploded perspective view of a panoramic support for a camera according to a preferred embodiment of the invention, showing the camera supported in a horizontal orientation for making horizontal-format exposures.

The invention is disclosed as being embodied preferably a panoramic support for use with a one-time-use camera. Because the features of a panoramic support and a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–7 show a panoramic support 10 for a 27 exposure one-time-use camera 12. The one-time-use camera 12 has a single-element, fixed focal length, taking lens 14.

The panoramic support 10 comprises a tripod 16, a base 18, a dual-count exposure counter 20, a rotatable indexing head 22 and a box-like camera holder 24. See FIGS. 1 and 3.

The tripod 16 has an upstanding, centered screw 26 that is received in a threaded well (not shown) in the bottom of the base 18 to affix the base to the tripod.

The base 18 has a centered cavity 28 in which the indexing head 22 is located on top of the exposure counter 20. A single retaining protuberance 30 of the base 18 is received in a notch 32 in the exposure counter 20 to hold the exposure counter stationary within the cavity 28. See FIGS. 1, 3 and 7. A pair of resilient tabs 34 and 36 of the base 18 extend into an annular edge-groove 38 in the indexing head 22 to rotationally support the indexing head for manual rotation within the cavity 28.

The camera holder 24 has a leaf-spring hooked retainer 40 for holding the one-time-use camera 12 in the camera holder and two differently configured resilient snap-in connectors 42 and 44. The snap-in connector 42 is shaped to only fit into a mating mount 46 in one side 48 of the indexing head 22 to support the one-time-use camera in a horizontal orientation, as shown in FIG. 1, for making horizontal-format exposures, i.e. exposures formatted with the horizontal dimension being greater than the vertical dimension. The snap-in connector 44 is shaped to only fit into a mating mount 50 in an opposite side 52 (parallel to the side 48) of the indexing head 22 to support the one-time-use camera in a vertical orientation, as shown in FIG. 3, for making vertical-format exposures, i.e. exposures formatted with the vertical dimension being greater than the horizontal dimension.

Figure 2:
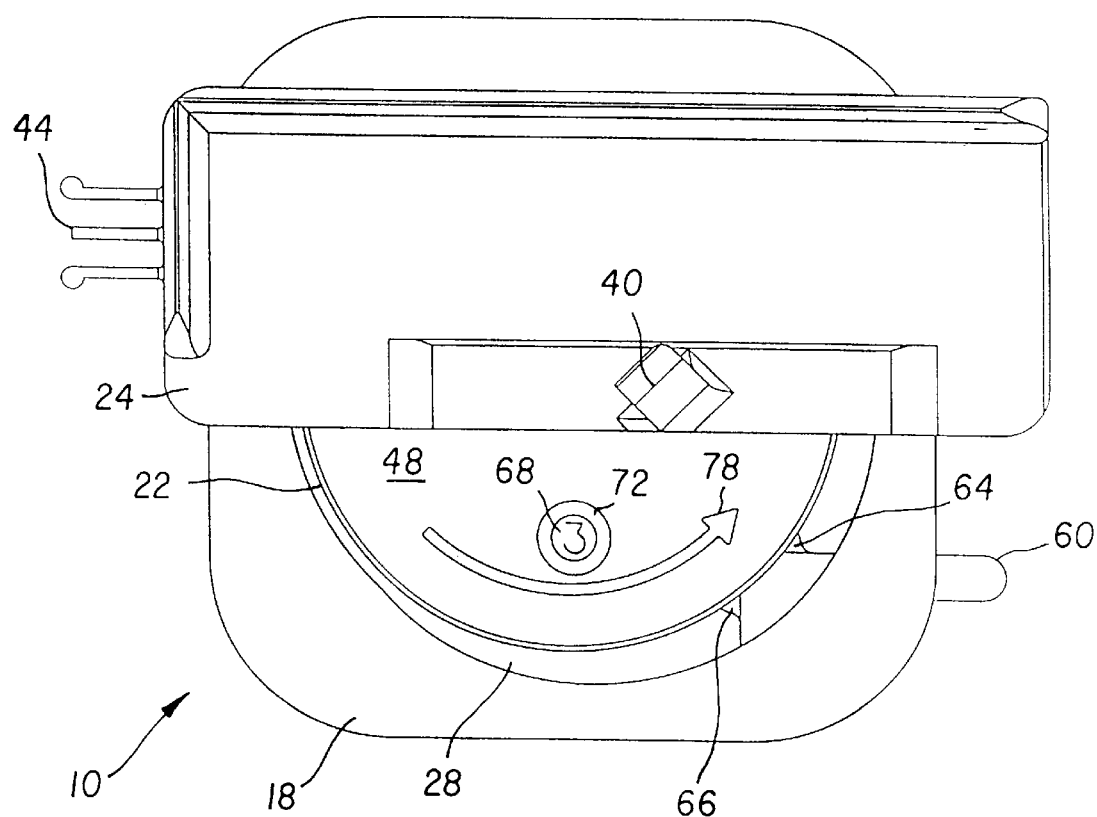
FIG. 2 is a top plan view of the panoramic support without the camera, as shown in FIG. 1.
Figure 3:
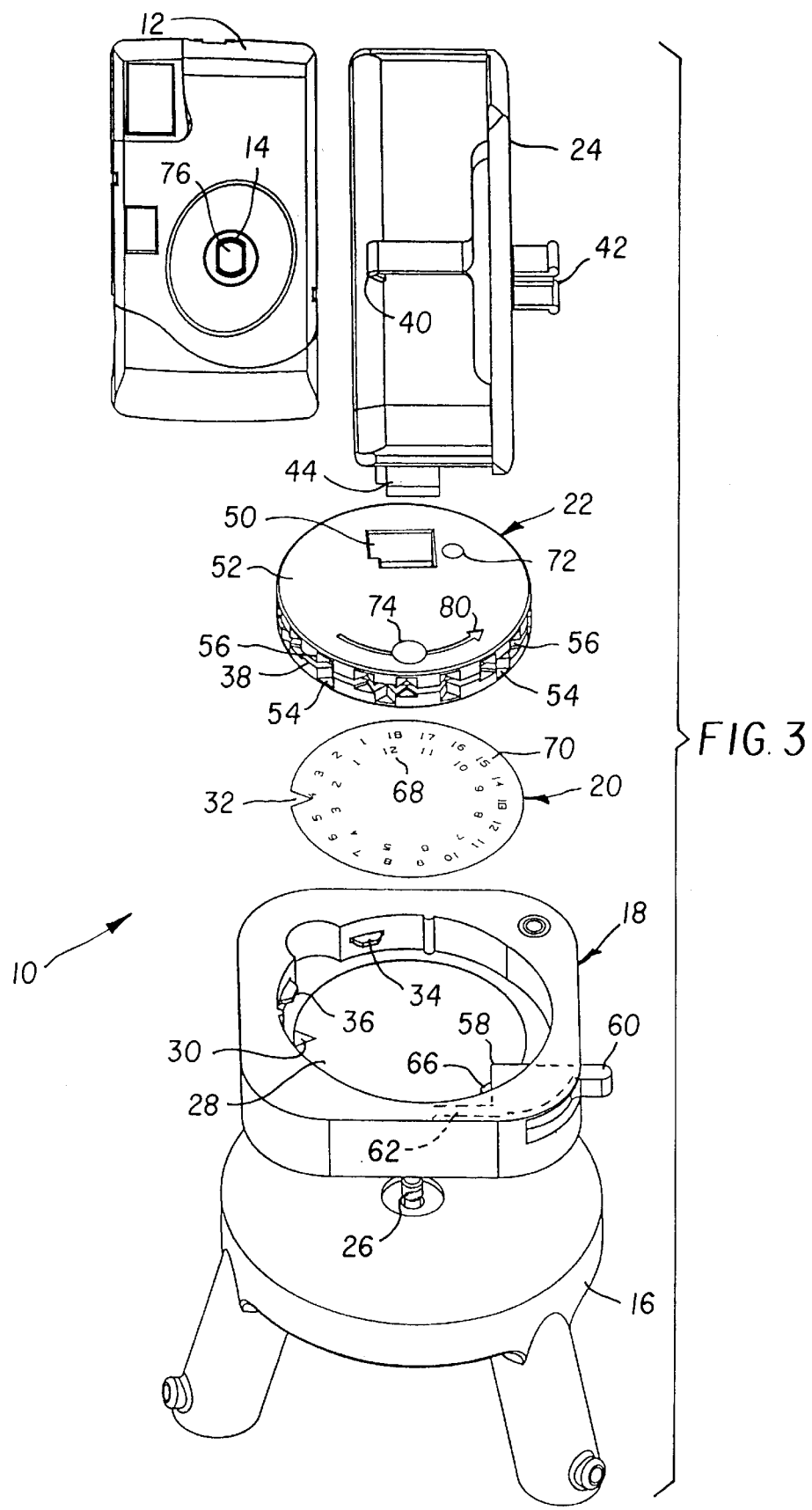
FIG. 3 is an exploded perspective view of the panoramic support, showing the camera supported in a vertical orientation for making vertical-format exposures.
Figure 4:
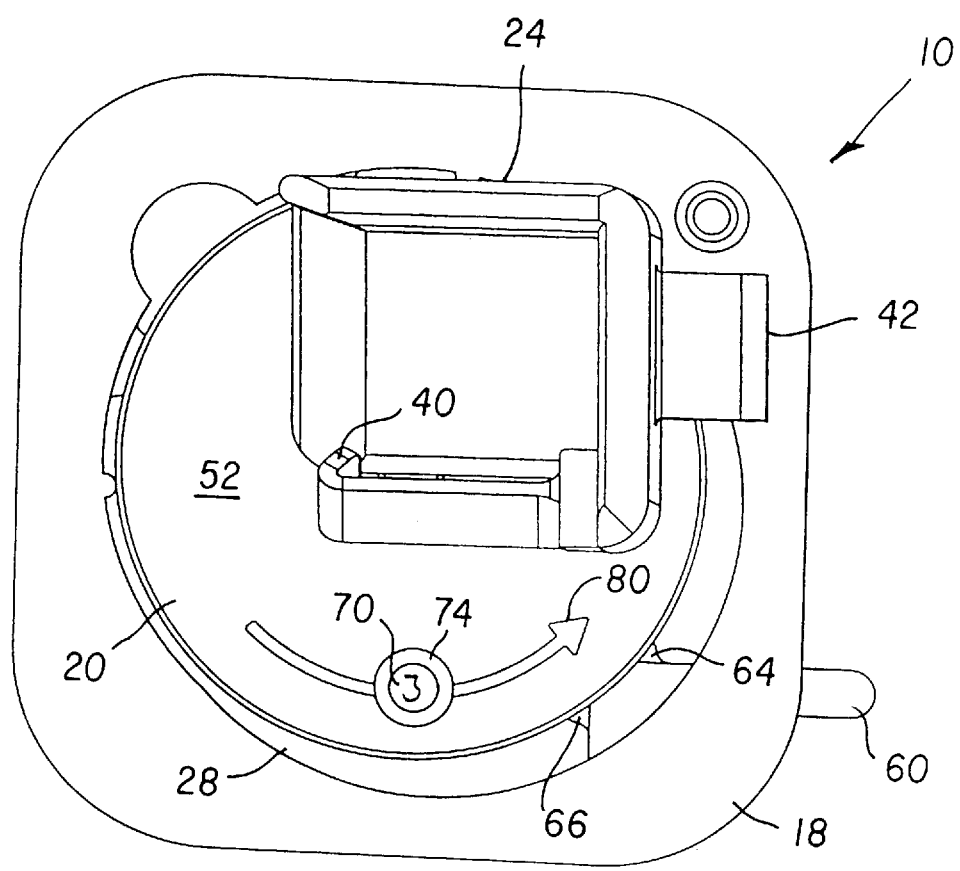
FIG. 4 is a top plan view of the panoramic support without the camera, as shown in FIG. 3.
Figure 5:
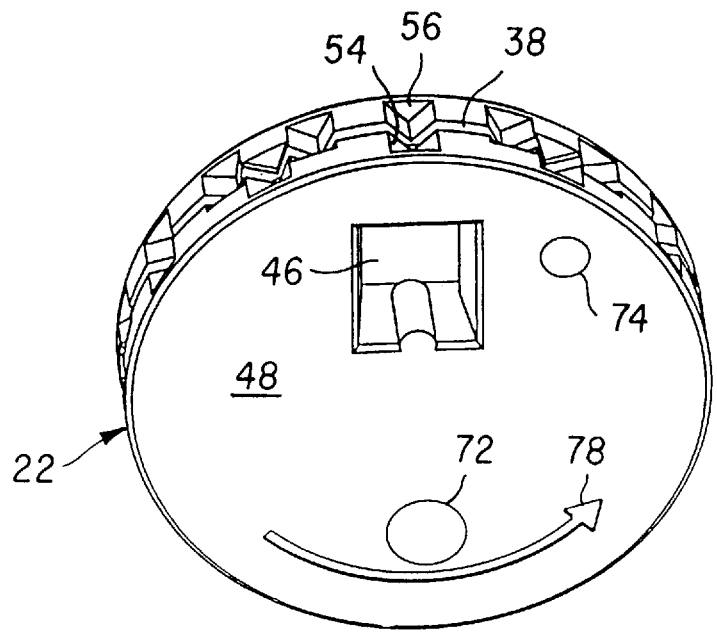
FIG. 5 is a perspective view of a rotatable indexing head of the panoramic support, showing a planar side of the rotatable indexing head for supporting the camera in the horizontal orientation.
Figure 6:
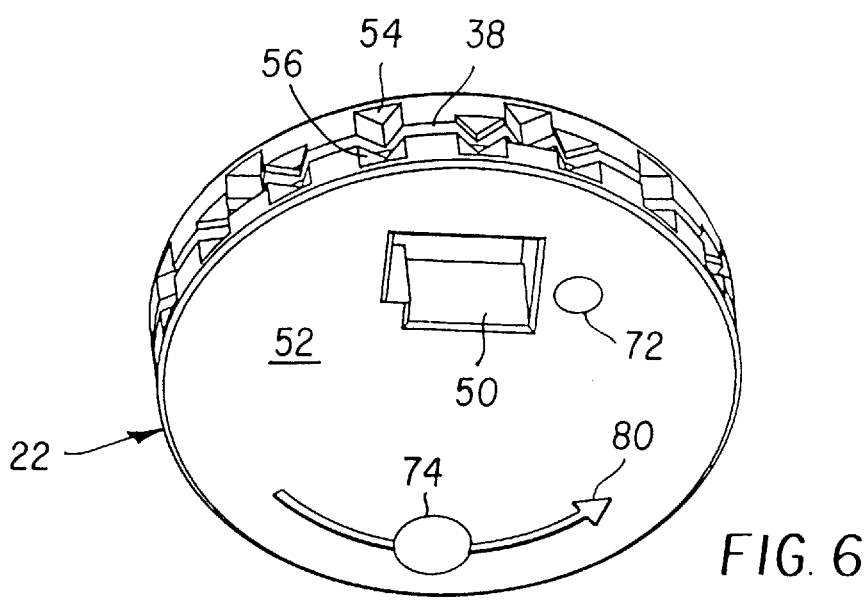
FIG. 6 is a perspective view of the rotatable indexing head, showing an opposite side of the rotatable indexing head for supporting the camera in the vertical orientation.
Figure 7:
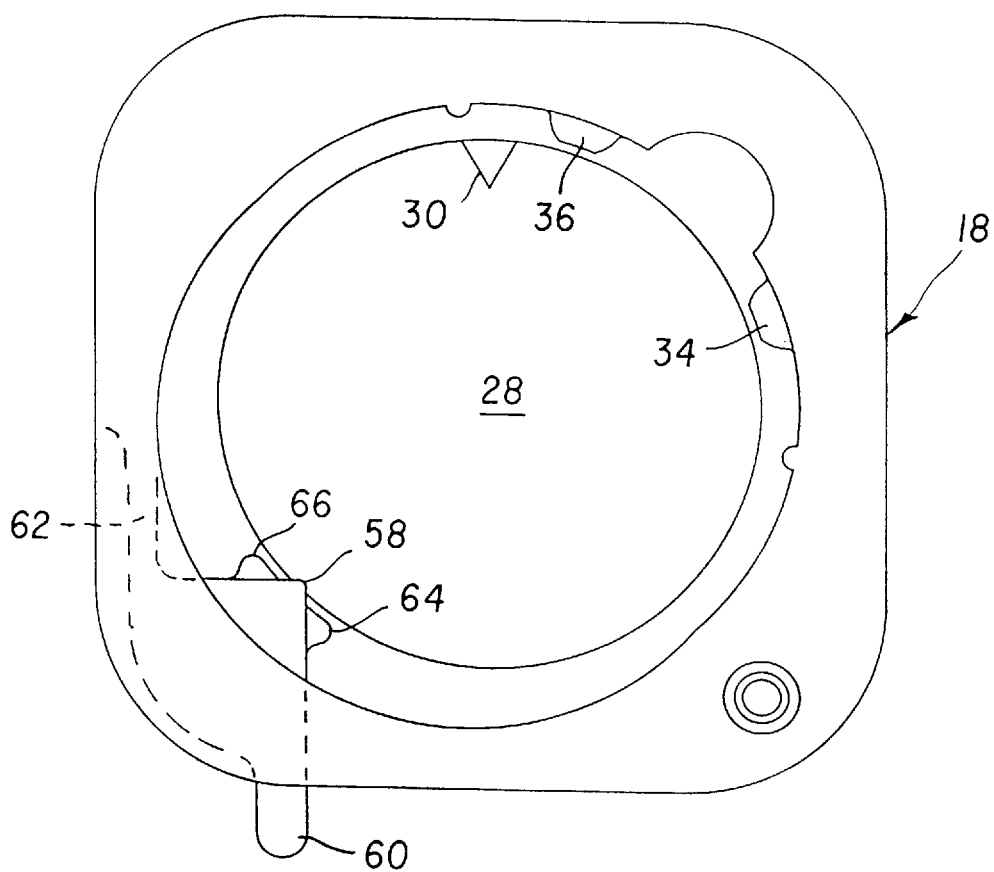
FIG. 7 is a top plan view of a base of the panoramic support.

The indexing head 22 can be manually placed in the cavity 28 in the base 18 with its side 48 up, as shown in FIGS. 1 and 2, to permit the one-time-use camera 12 to be supported in the horizontal orientation, or alternatively it can be manually placed in the cavity with its side 52 up, as shown in FIGS. 3 and 4, to permit the one-time-use camera to be supported in the vertical orientation. Thus, the indexing head 22 must be flipped over 180° to change the camera orientation.

The indexing head 22 has an annular series of twelve interdental spaces 54 and an annular series of eighteen interdental spaces 56, between which the annular edge-groove 38 continuously extends. The twelve interdental spaces 54 have a uniform pitch that spaces them 30° apart from one another, and the eighteen interdental spaces 56 have a uniform pitch that spaces them 20° apart from one another. A pawl 58 is shaped to be received in successive ones of the twelve interdental spaces 54 to arrest the indexing head 22 each 30° of rotation in the cavity 28, when the indexing head is rotated in the cavity with its side 48 up as shown in FIGS. 1 and 2, and to be received in successive ones of the eighteen interdental spaces 56 to arrest the indexing head each 20° of rotation in the cavity, when the indexing head is rotated in the cavity with its side 52 up as shown in FIGS. 3 and 4. The pawl 58 forms one corner of a release handle 60 that has a resilient cantilever 62 integrally connected to the base 18 to permit the pawl to be manually disengaged from successive ones of the twelve interdental spaces 54 or successive ones of the eighteen interdental spaces 56. A pair of rigid tabs 64 and 66 of the release handle 60 extend into the annular edge-groove 38, when the pawl 58 is in one of the interdental spaces 54 or 56, to rotationally support the indexing head 22 (in addition to the pair of resilient tabs 34 and 36 of the base 18) in the cavity 28.

The exposure counter 20 has a 12-exposure count 68 designated "1", "2", . . . "12" and an 18-exposure count 70 designated "1", "2", . . . "18". The indexing head 22 has a window 72 for viewing the 12-exposure count 68 one at a time, when the indexing head 22 is rotated in the cavity 28 with its side 48 up as shown in FIGS. 1 and 2, and a window 74 for viewing the 18-exposure count 70 one at a time when the indexing head is rotated in the cavity with its side 52 up as shown in FIGS. 3 and 4. The camera holder 40 is adapted to conceal the window 74 when the snap-in connector 42 is inserted into the mating mount 46 in the side 48 of the indexing head 22 to support the one-time-use camera 12 in the horizontal orientation as shown in FIGS. 1 and 2, and is adapted to conceal the window 72 when the snap-in connector 44 is inserted into the mating mount 50 in the side 52 of the indexing head to support the one-time-use camera in the vertical orientation as shown in FIGS. 3 and 4.

The indexing head 22 supports the one-time-use camera 12 for rotation about the nodal point 76 of the single-element taking lens 14 regardless of whether the one-time-use camera is supported in the horizontal orientation or the vertical orientation. As is generally known, the nodal point 76 of the taking lens 14 is the intersection of the principal plane of the taking lens with its optical axis (not shown).

Operation

When the indexing head 22 is located in the cavity 28 with its side 48 up and the one-time-use camera 12 is supported in the horizontal orientation as shown in FIGS. 1 and 2, the indexing head can be manually rotated 30° about the nodal point 76 of the taking lens 14 in the counter-clockwise direction indicated by the arrow imprint 78, each time the pawl 58 is removed from one of the twelve interdental spaces 54. The indexing head 22 is rotated the same angle (30°) following each horizontal-format exposure in order to obtain a series of twelve slightly overlapping exposures that can be combined to provide a comprehensive panoramic picture. At the same time, the 12-exposure count 68 beginning with "1" and ending with "12" can be viewed in succession through the window 72 in the indexing head 22.

When the indexing head 22 is located in the cavity 28 with its side 52 up and the one-time-use camera 12 is supported in the vertical orientation as shown in FIGS. 3 and 4, the indexing head can be manually rotated 20° about the nodal point 76 of the taking lens 14 in the counter-clockwise direction indicated by the arrow imprint 80, each time the pawl 58 is removed from one of the eighteen interdental spaces 56. The indexing head 22 is rotated the same angle (20°) following each vertical-format exposure in order to obtain a series of eighteen slightly overlapping exposures that can be combined to provide a comprehensive panoramic picture. At the same time, the 18-exposure count 70 beginning with "1" and ending with "18" can be viewed in succession through the window 74 in the indexing head 22.

The invention has been described with reference to a preferred embodiment. However, it will be appreciated that variations and modifications can be effected by a person of ordinary skill in the art without departing from the scope of the invention. For example, instead of the one-time-use camera 10 which makes successive exposures, a digital camera can be used to make successive digital image recordings. Moreover, instead of a series of separate photographs being manually assembled to provide a panoramic picture, the digital recorded images can be electronically assembled to provide a panoramic digital image. Alternatively, negatives, slides or prints can be electronically scanned and assembled to obtain the panoramic picture.

PARTS LIST 10. panoramic support
12. one-time-use camera
14. taking lens
16. tripod
18. base
20. exposure counter
22. rotatable indexing head
24. camera holder
26. screw
28. cavity
30. retaining protuberance
32. notch
34. tab
36. tab
38. annular edge-groove
40. hooked retainer
42. snap-in connector
44. snap-in connector
46. mount
48. side
50. mount
52. side
54. 12 interdental spaces
56. 18 interdental spaces
58. pawl
60. release handle
62. cantilever
64. tab
66. tab
68. 12-exposure count
70. 18-exposure count
72. window
74. window 76. nodal point
78. arrow imprint
80. arrow imprint

What is claimed is:

1. A panoramic support for a camera comprising a rotatable indexing head adapted to support the camera alternatively in a horizontal orientation for making horizontal-format recorded images and in a vertical orientation for making vertical-format recorded images, is characterized in that:

said rotatable indexing head has a first window for viewing a first recorded image count when said rotatable head supports the camera in said horizontal orientation and a second window for viewing a second recorded image count when said rotatable head supports the camera in said vertical orientation, and said rotatable indexing head supports the camera over said second window to conceal the second window when the rotatable indexing head supports the camera in said horizontal orientation and supports the camera over said first window to conceal the first window when the rotatable indexing head supports the camera in said vertical orientation.

2. A panoramic support as recited in claim 1, wherein a base rotationally supports said rotatable indexing head in a first position to support the camera in said horizontal orientation and permit the camera to be rotated a first angle between each horizontal-format image recording and said base supports said rotatable indexing head in a reverse position, flipped over 180 degrees from said first position, to support the camera in said vertical orientation and permit the camera to be rotated a second angle between each vertical-format image recording.

3. A panoramic support as recited in claim 1, wherein a single-piece dual-count image counter simultaneously provides said first recorded image count at said first window and said second recorded image count at said second window.

4. A panoramic support as recited in claim 1, wherein said rotatable indexing head has two separate mutually-exclusive mounts which are configured differently from each other to allow only one of them to be used at a time to support the camera alternatively in said horizontal and vertical orientations.

5. A panoramic support for a camera comprising a rotatable indexing head adapted to support the camera for rotation both in a horizontal orientation for making horizontal-format recorded images and in a vertical orientation for making vertical-format recorded images, is characterized in that:

said rotatable indexing head has a first window for viewing a first recorded image count when the rotatable head supports the camera in said horizontal orientation, which is located to be concealed when the rotatable indexing head supports the camera in said vertical orientation, and said rotatable indexing head has a second window for viewing a second recorded image count when the rotatable head supports the camera in said vertical orientation, which is located to be concealed when the rotatable indexing head supports the camera in said horizontal orientation.

6. A panoramic support as recited in claim 5, wherein said rotatable indexing head has a mount on one side for supporting the camera in said horizontal orientation and a mount on another side, parallel to said one side, for supporting the camera in said vertical orientation, which requires said rotatable indexing head to flipped over 180 degrees to change the orientation of the camera.

* * * * *